United States Patent [19]

Aoki et al.

[11] Patent Number: 5,075,698
[45] Date of Patent: Dec. 24, 1991

[54] METHOD OF DRIVING A RECORDING HEAD AND A RECORDING APPARATUS UTILIZING THIS METHOD

[75] Inventors: Makoto Aoki, Yokohama; Jun Kawai, Tokyo, both of Japan

[73] Assignee: Canon Kabushiki Kaisha, Tokyo, Japan

[21] Appl. No.: 426,683

[22] Filed: Oct. 26, 1989

[30] Foreign Application Priority Data

Nov. 4, 1988 [JP] Japan .................................. 63-277404

[51] Int. Cl.⁵ .......................... H04N 1/21; G01D 9/00
[52] U.S. Cl. ............................... 346/1.1; 346/76 PH; 346/140 R; 358/298
[58] Field of Search ............ 346/1.1, 76 PH, 140 PD; 358/298, 296, 455, 456

[56] References Cited

U.S. PATENT DOCUMENTS

| | | | |
|---|---|---|---|
| 4,479,132 | 10/1984 | Iwakura | 346/76 PH |
| 4,510,505 | 4/1985 | Fukui | 346/76 PH |
| 4,510,507 | 4/1985 | Ishikawa | 346/76 PH |
| 4,636,810 | 1/1987 | Asakura et al. | 346/76 PH |
| 4,675,700 | 6/1987 | Nagira et al. | 346/76 PH |
| 4,806,949 | 2/1989 | Onuma et al. | 346/76 PH |

Primary Examiner—Benjamin R. Fuller
Assistant Examiner—Huan Tran
Attorney, Agent, or Firm—Fitzpatrick, Cella Harper & Scinto

[57] ABSTRACT

Disclosed are a method of driving a thermal recording head and a recording apparatus utilizing this method. When recording is to be effected at Gradation n, pulses corresponding to Gradations n to 1 and having predetermined pulse widths in correspondence with the gradations are generated, and are successively supplied to the thermal head in order from Gradations n to 1.

12 Claims, 13 Drawing Sheets

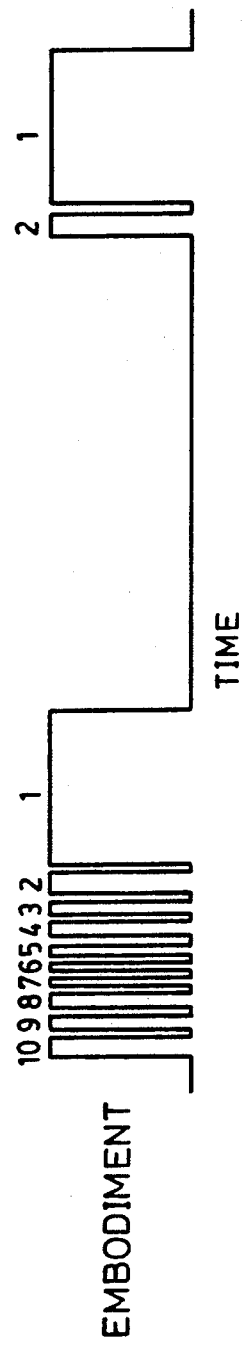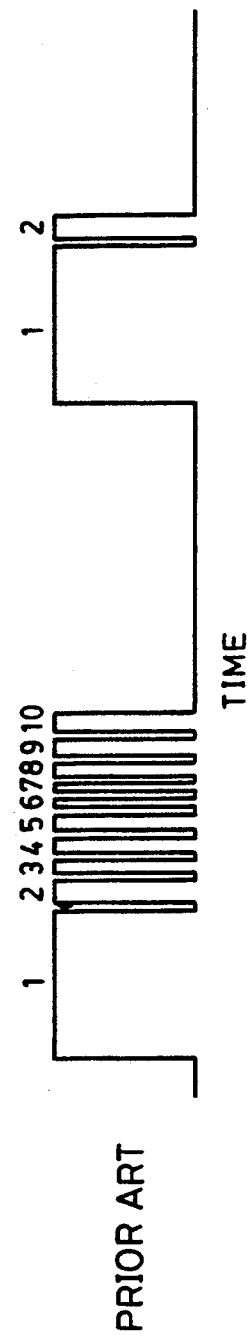

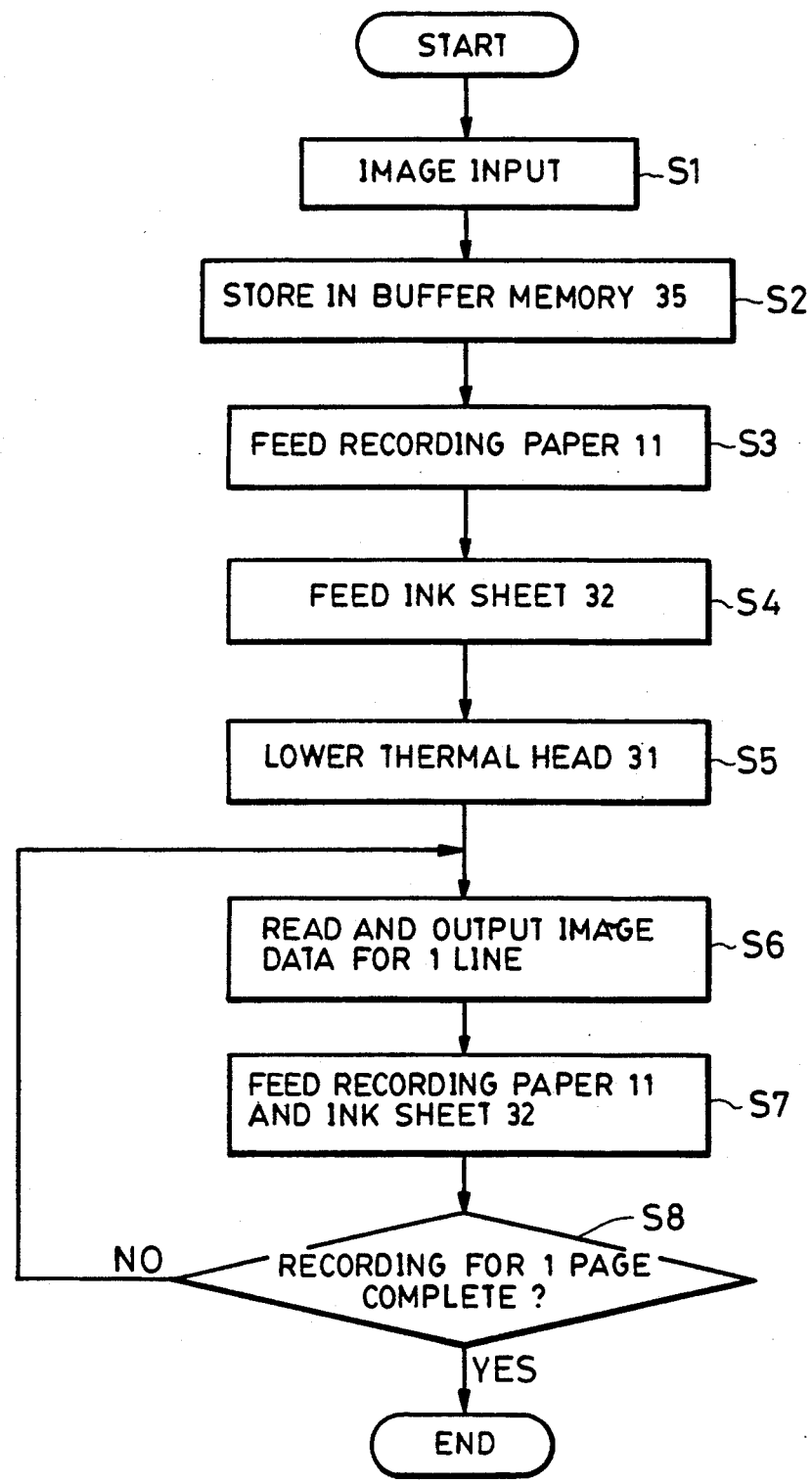

METHOD OF DRIVING A RECORDING HEAD AND A RECORDING APPARATUS UTILIZING THIS METHOD

BACKGROUND OF THE INVENTION

1. Field of the Invention

The present invention relates to a method of driving a recording head adapted to effect recording on a recording medium by using heat. It also relates to a recording apparatus utilizing this method.

The above recording apparatus may, for example, be an electronic typewriter, copying machine, facsimile machine, or printer or the like. The recording system having a recording head adapted to effect recording by using heat may, for example, be (1) the so-called ink-jet system in which a change of state is caused by heat in the recording liquid and, in accordance with this change, the recording liquid is expelled through discharge nozzles so as to form a spray of liquid drops; (2) the so-called thermosensitivity system according to which thermosensitive paper is caused to change to color by heating it; or (3) the so-called thermal-transfer system according to which the ink retained on an ink ribbon is selectively transferred to the recording medium by means of heat.

2. Description of the Prior Art

Recording apparatus such as printers and facsimile terminal equipment are designed to form dot patterns on recording sheets (recording media such as recording paper, thin plastic plates or the like) by selectively driving in accordance with recording information (e.g., image data signals) a plurality of dot-forming elements provided on the recording head. That recording apparatus may be of the serial type in which recording is performed while moving the recording head along the sheet-width direction, the line printing type in which recording is effected collectively for a predetermined length in the line direction, or the page printing type in which recording for an entire page is effected simultaneously.

The recording system used may be the thermal system, the ink-jet system, the wire-dot system or any other system utilizing dot-forming elements. Of these, the thermal system can be classified into the thermal-transfer system in which ink is transferred to a sheet of ordinary paper by means of an ink sheet, and the thermosensitivity system in which thermosensitive paper changes color upon being heated.

Conventionally, a medium-tone recording system for indicating differences in density has been employed when performing color recording or image recording using a plurality of colors such as cyan, magenta, yellow and black. These systems use an area-gradation method, such as the Dither method, which is based on the principle of binary recording for expressing gradations. In that method, a plurality of dots are regarded as one unit and the medium tone is determined by the proportion of ON and OFF dots (binary recording) in that unit, thus giving the appearance of an image of medium-tone dots, when in fact no medium-tone does exist.

The problem with the above-described area-gradation method is that the requisite dot number with respect to one dot must be increased before many gradations can be expressed, which results in the image resolution being deteriorated. To obtain an image of a resolution of about 6 pixels/mm with 64 gradations, about 48 dots/mm must be generated by the recording head. To realize this with a thermal printer, a thermal head of 48 dots/mm is required. However, it is difficult to manufacture thermal heads of such high density. Even if such a thermal head were realized, it would be rather impractical since it would have to have an enormous number of elements, which means a large-scale driving circuit would be necessary to drive this thermal head. Thus, there is a limit to the quality of the gradation-recording-images obtained by binary recording. Hence, there is a demand for a practical multivalue-gradation-recording system in which a dot of one size is expressed in many gradations in some way or other.

In view of this, the inventors of the present invention have proposed in Japanese Patent Laid-Open No. 63-54261 (Japanese Patent Application No. 61-198188, filed on Aug. 26, 1986 and laid open to public inspection on Mar. 8, 1988) a thermal head which is capable of performing multivalue recording. This thermal head is designed such that the width of the electrode at its connection point with the heating element is equal to or smaller than the effective width of the heating element allowing recording. By virtue of this structure, the section of the heating element in the vicinity of the connection point between it and the electrode generates heat more intensely, thereby establishing selective heat distribution and making it possible to realize satisfactory multivalue gradation recording.

FIGS. 1 to 6 show the construction of a conventional thermal-head-driving apparatus for realizing gradation recording.

The apparatus shown includes a color-image input terminal 1 for separate color images of red, green and blue, a color conversion circuit 2 for converting input RGB (red, green and blue) signals into YMC (yellow, magenta and cyan) signals, a data line memory 3 for storing image data for each printed line, and a medium-tone control section 4. When printing at Gradation Level n (hereinafter referred to simply as "Gradation n"), pulses corresponding to Gradations 1 to n are sequentially supplied by this medium-tone control section 4. FIG. 2 shows an example of a pulse row output when the gradation is 10. The conventional apparatus further includes a control section 7 adapted to successively supply pulses corresponding to all gradations from the minimum to the maximum, in the order and with the respective pulse widths shown in FIG. 3, and a thermal head 8 consisting of heating resistor elements $R_1$ to $R_n$ and adapted to dissolve or sublimate the ink or dye of an ink sheet 10 and to transfer it to a recipient sheet 11. The conventional apparatus further includes a temperature measuring element 9 for measuring the temperature of the thermal head 8, and a platen roller 12.

FIG. 4 is a circuit and block diagram of the medium-tone control section 4 shown in FIG. 1.

In FIG. 4, reference numeral 17 indicates a shift register adapted to convert serial-data signals for one line of data (1-line data) into parallel signals. Reference numeral 16 indicates a latch for latching the parallel signals obtained from shift register 17. $A_1$ to $A_n$ represent AND gates adapted to output data signals only for the time corresponding to the pulse width of strobe signals. $Q_1$ to $Q_n$ represent transistors adapted to drive the heating resistor elements $R_1$ to $R_n$ in accordance with the pulse rows from the AND gates $A_1$ to $A_n$. The reference numeral 18 indicates a common electrode for applying voltage; 19 indicates an input terminal for strobe signals; and reference numeral 20 indicates an input terminal for data signals.

FIG. 5 is a timing chart showing an example of timing for the above-described medium-tone control section 4. This chart shows an example of the drive timing for the thermal-head 8.

In this conventional thermal-head driving apparatus, which has the above-described construction, pulses as shown in FIG. 6(a) are supplied from the medium-tone control section 4 to the thermal head 8 when lower density printing immediately follows higher density printing, for example, when performing printing at Gradation 2 immediately after printing at Gradation 10. However, since the temperature-time characteristic when the thermal head cools down to the initial temperature $T_0°$ C. is to be represented with an exponential function, the temperature $T_1°$ C. of the thermal head immediately before the printing at Gradation 2 is higher than the initial temperature $T_0°$ C. and there is the danger that printing at Gradation 2 will be at a higher density than is the proper density of that level.

SUMMARY OF THE INVENTION

It is accordingly an object of this invention to provide a recording-head driving method which allows gradation to be expressed more accurately, as well as a recording apparatus using this method.

Another object of this invention is to provide a recording-head driving method making possible the generation of images with higher quality, as well as a recording apparatus using this method.

Still another object of this invention is to provide a recording-head driving method with increased recording speed, as well as a recording apparatus using this method.

A further object of this invention is to provide a recording-head driving method which makes it possible to realize a further increased recording speed while also obtaining images with higher quality, as well as a recording apparatus using this method.

In one embodiment of this invention there is provided a method of driving a recording head for recording on a recording medium at a density corresponding to a gradation n greater than 1. A series of pulses are generated wherein the position of each pulse in the series corresponds to a predetermined gradation n through 1 of recording density and pulses are supplied in succession to the recording head beginning with a pulse corresponding to gradation n. By this method the recording head is thereby driven.

In yet another embodiment of this invention, there is provided a method of driving a recording head with a plurality of heating elements for recording at multiple gradations wherein the maximum density corresponds to a gradation n greater than 1. A series of driving pulses for energizing the heating elements are generated, the driving pulses characterized in that they are maintainable for a sufficient time to obtain print densities corresponding to the different gradations. Driving pulses are then applied in succession to the heating elements, beginning with pulses whose position corresponds to the maximum density gradation n and continuing down to pulses whose position corresponds to the minimum density gradation 1, thereby driving the recording head.

In still another embodiment of this invention, there is provided a recording apparatus for recording on a recording medium at a density corresponding to a gradation n greater than 1. The apparatus includes a recording head for recording on a recording medium and a control means for supplying a series of pulses in succession to the thermal head in order from gradation n down to gradation 1. The position of each pulse in the series corresponds to a predetermined gradation n through 1. The apparatus also includes a feeding means for feeding the recording medium.

BRIEF DESCRIPTION OF THE DRAWINGS

FIG. 13 is a flowchart showing the recording process in a thermal recording apparatus to which an embodiment of the invention is applied.

DETAILED DESCRIPTION OF THE INVENTION

An embodiment of this invention will now be described in detail with reference to the accompanying drawings.

The embodiment described below is designed as follows: when printing at Gradation n, pulses corresponding to Gradation n to 1, and which have predetermined pulse widths in correspondence with the gradations, are successively supplied from Gradation n down to Gradation 1 to the thermal head.

Figure 7:
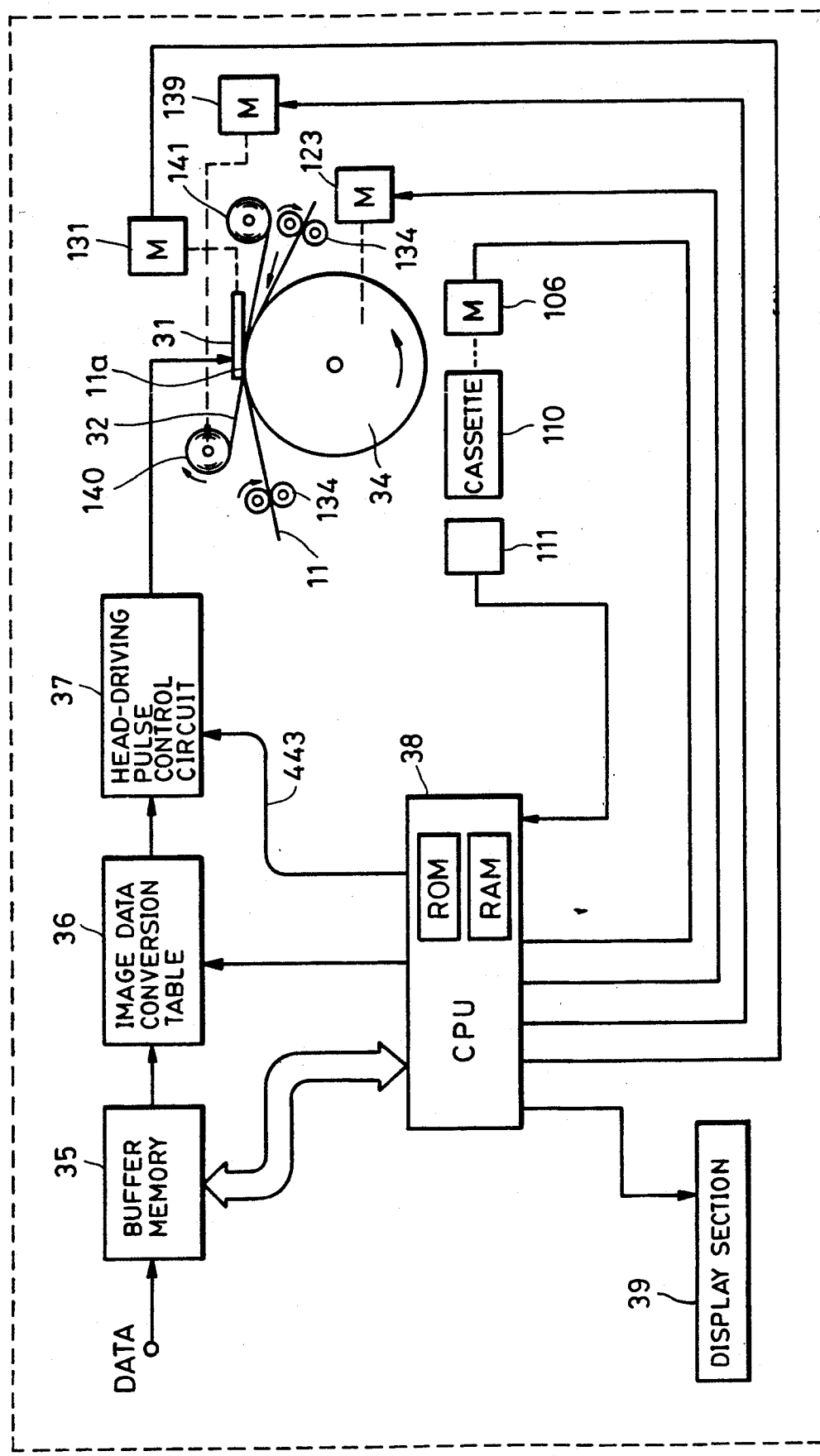
FIG. 7 is a diagram showing the construction of a thermal recording apparatus to which a thermal driving device in accordance with an embodiment of this invention is applied.

FIG. 7 shows an embodiment of this invention.

Figure 1:
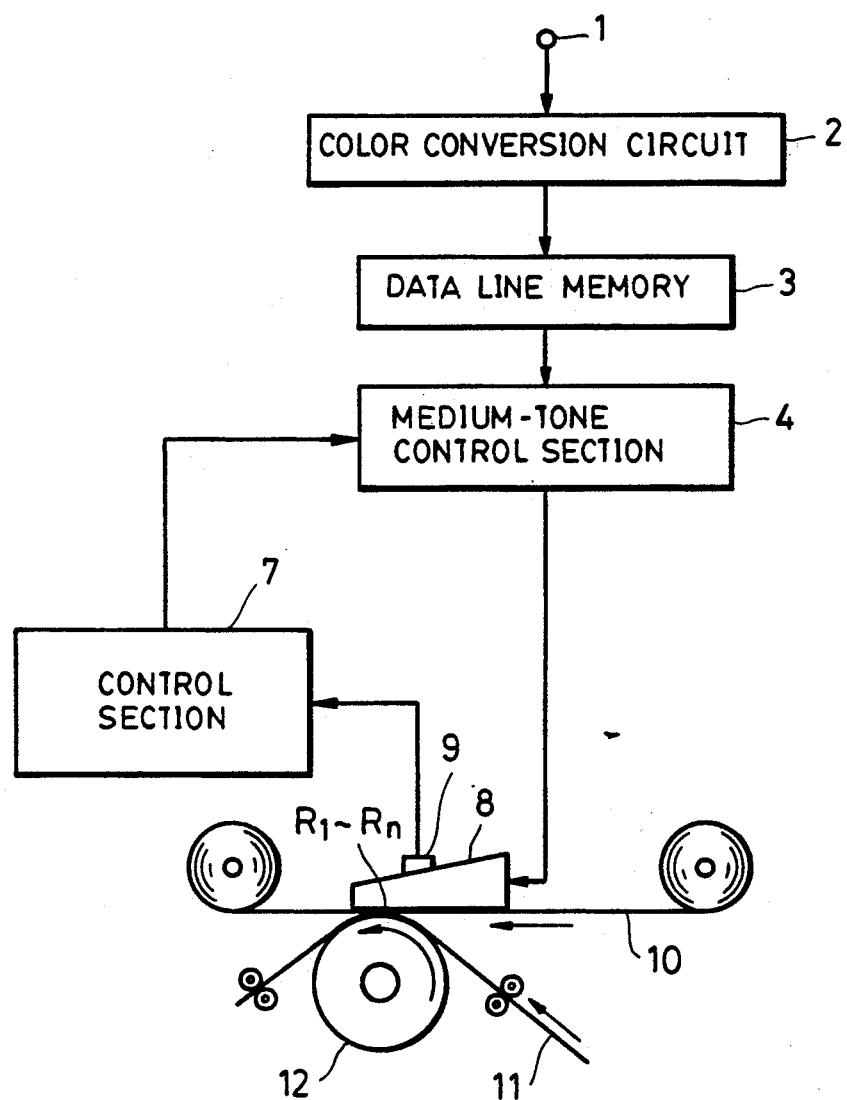
FIG. 1 is a block diagram showing a conventional thermal-head driving apparatus.
Figure 2:
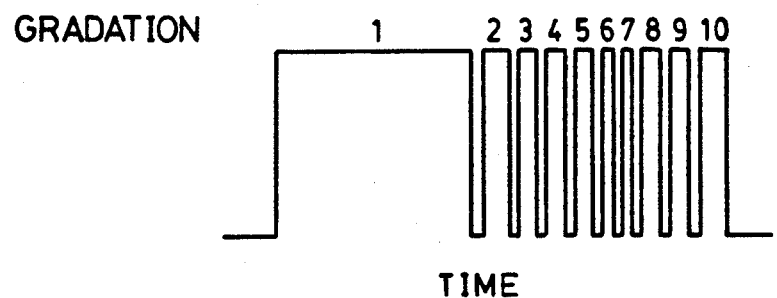
FIG. 2 is a chart showing an example of a pulse row which corresponds to Gradation 10 in the conventional apparatus.
Figure 3:
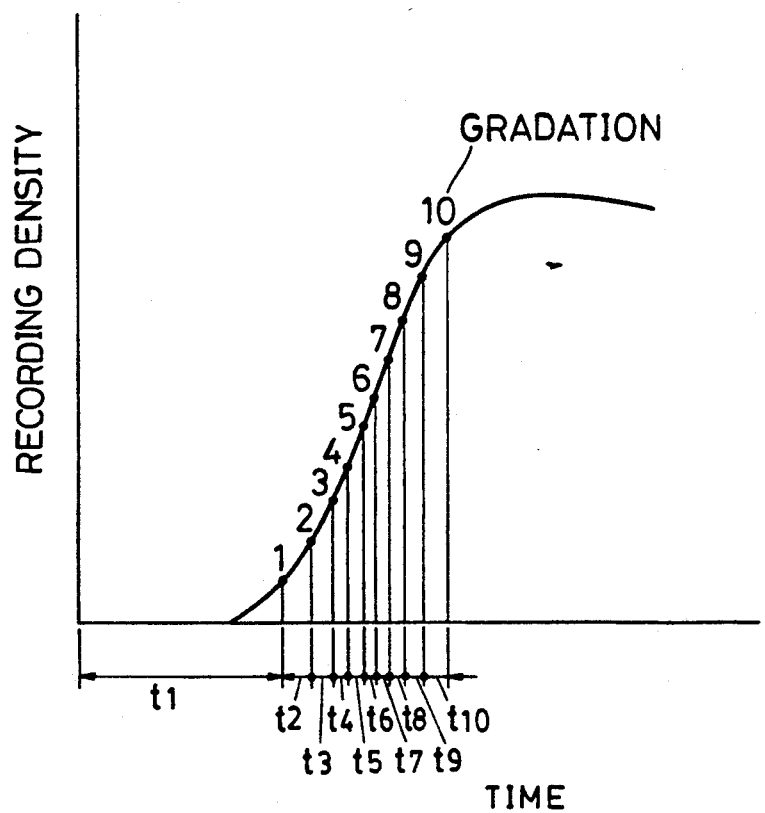
FIG. 3 is a chart showing the relationship between the recording density and the pulse row.
Figure 4:
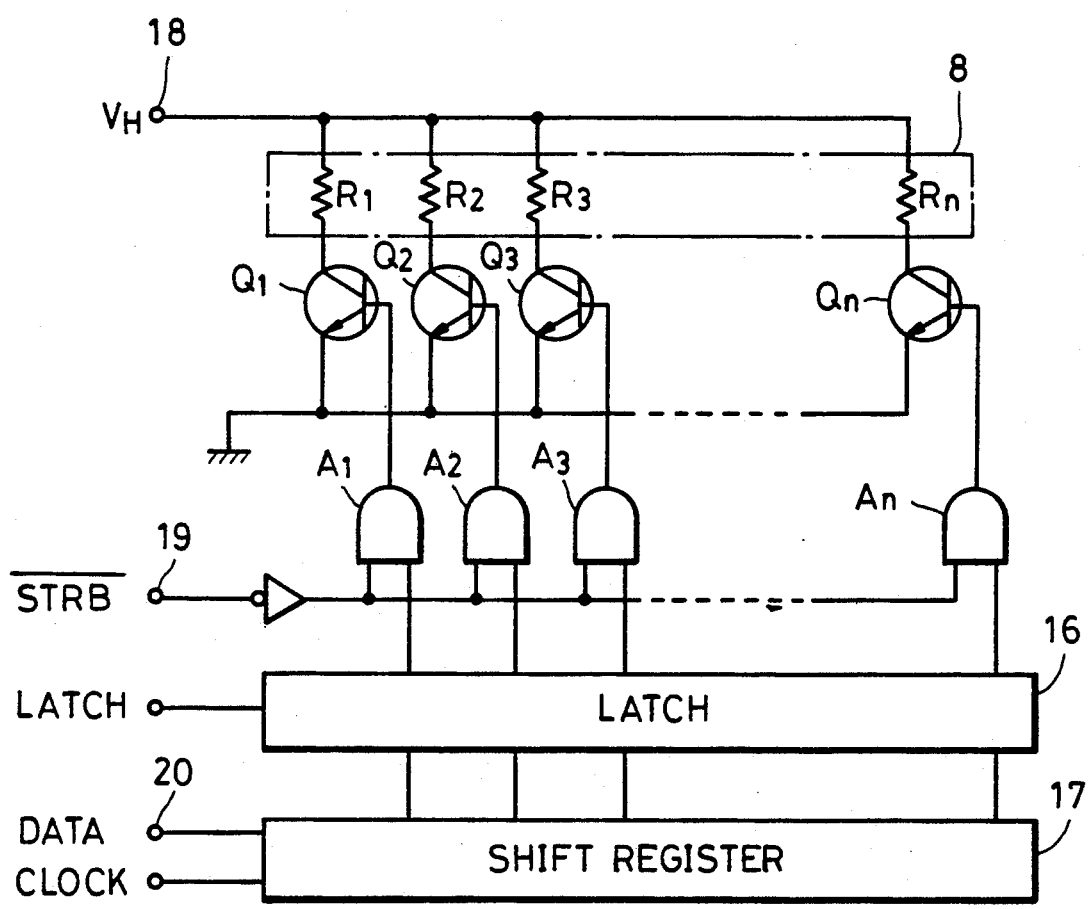
FIG. 4 is a circuit and block diagram of the medium-tone control section shown in FIG. 1.
Figure 5:
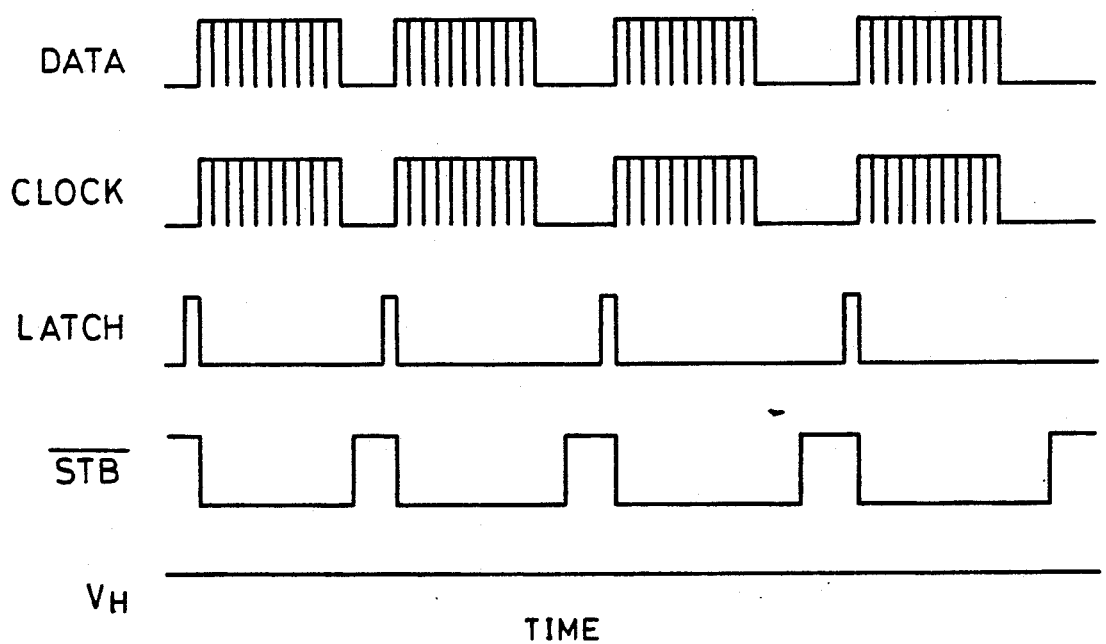
FIG. 5 is a timing chart showing a timing example for the medium-tone control section.
Figure 6:
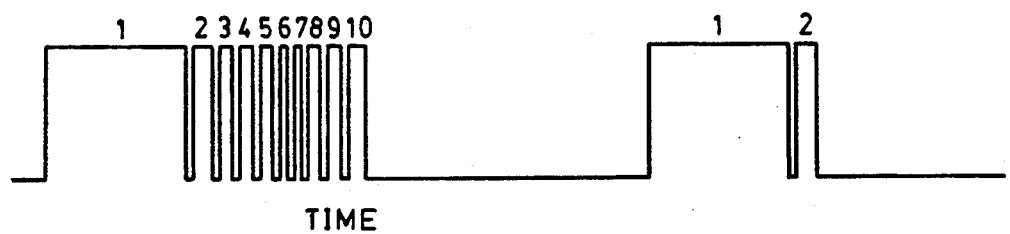
FIGS. 6(a) and 6(b) are diagrams illustrating the case where printing at Gradation 2 is effected immediately after printing at Gradation 10.
Figure 6B:
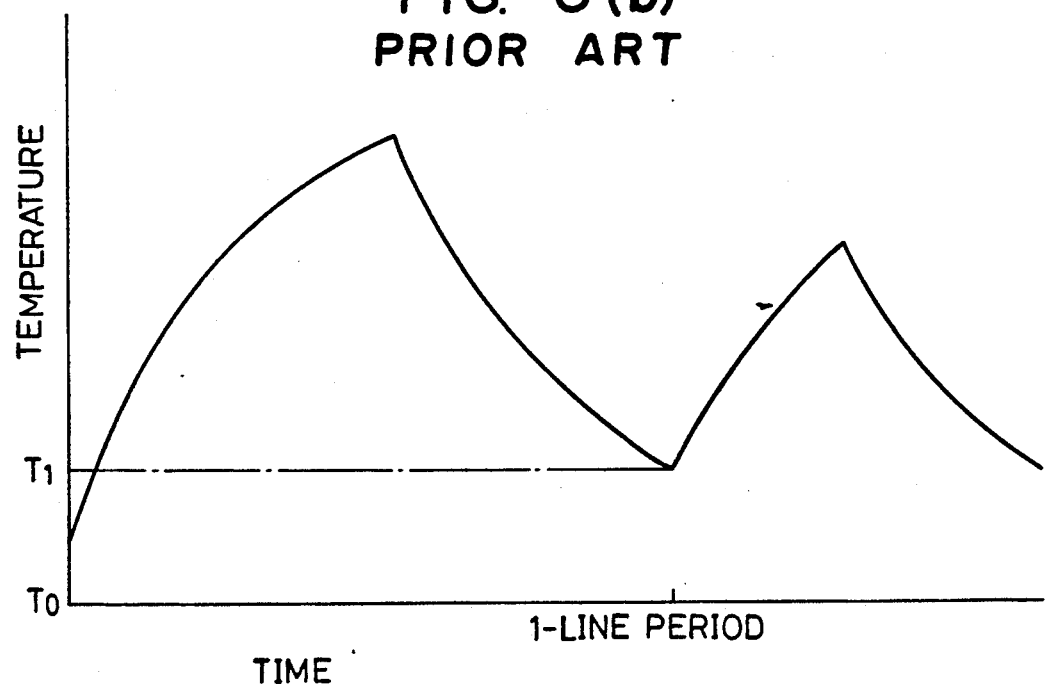
Figure 8:
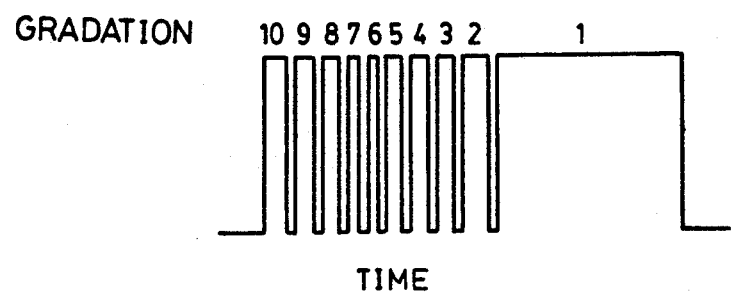
FIG. 8 is a diagram showing an example of a pulse row, corresponding to Gradation 10, of an embodiment of this invention.

This embodiment differs from the above-described prior art apparatus in the construction of the control section. In the control section 7 of the prior art apparatus as depicted in FIG. 1, the output pulses have pulse widths of the type shown in FIG. 3. These pulses correspond to gradations from the minimum to the maximum, respectively, and are successively supplied in this ascending order. In contrast, in the head-driving-pulse control circuit 37 (FIG. 7) of the present invention, which functions as the control section of the recording head of this embodiment of the invention, the output pulses have pulse widths as shown in FIG. 8. These pulses correspond to gradation from the maximum to the minimum, respectively, and are successively supplied in this order. In this embodiment of the invention, the pulse widths may be determined as, for example: 5 ms at Level 1, 2.3 ms at Level 2, 1.7 ms at Level 3, 1.2 ms at Level 4, 1.2 ms at level 5, 0.8 ms at Level 6, 1 ms at Level 7, 1.1 ms at Level 8, 1.5 ms at Level 9, and 1.9 ms at Level 10.

Figure 9:
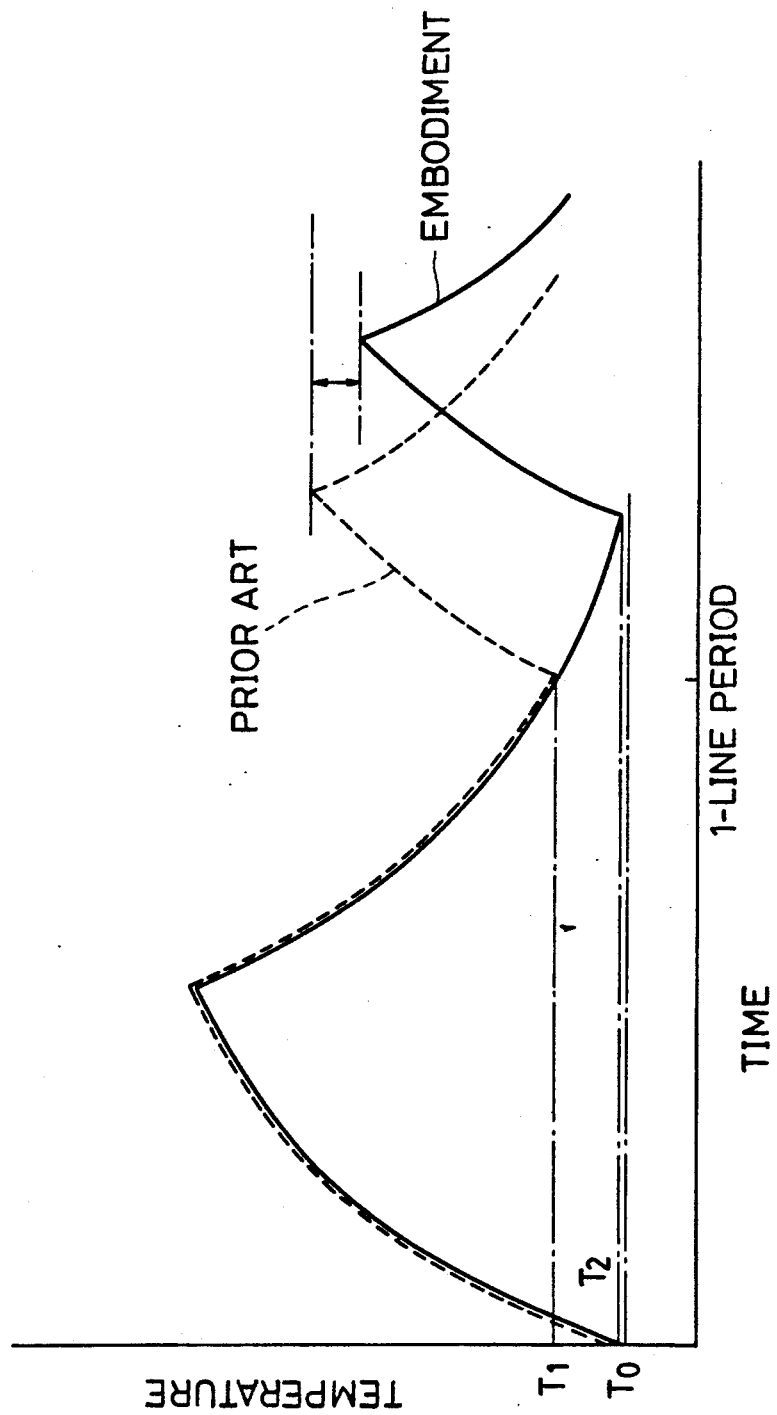
FIGS. 9(a), 9(b) and 9(c) are diagrams showing the case where printing at Gradation 2 is effected immediately after printing at Gradation 10.

This construction provides the following advantage: Suppose printing is to be effected with a low density (for example, Gradation 2) immediately after printing with a high density (for example, Gradation 10). In the prior art apparatus, the pulse row shown in FIG. 3(b) is output from the medium-tone control section 4 to the thermal head 8, whereas, in this embodiment, the pulse row shown in FIG. 9(a) is output. The temperature/time characteristics in this case are shown in FIG. 9(c). (FIGS. 9(a), 9(b) and 9(c) are diagrams illustrating the case where printing at Gradation 2 is effected immediately after printing at Gradation 10.) In the prior art apparatus, the temperature of the thermal head 8 is, as shown in FIG. 9(c), not restored to the initial temperature $T_0$ (for example, about 50° C.) after a 1-line period has elapsed following the application of the pulse row corresponding to Gradation 10, but returns only as far as the higher temperature $T_1$, which is somewhat higher than $T_0$. At higher temperature $T_1$ (which is, for example, about 70° C.), the pulse row corresponding to Gradation 2 is applied. In this embodiment, in contrast to the above prior art, the pulse row corresponding to Gradation 2, i.e., the pulse row shown in FIG. 9(a), is not applied when a 1-line period has elapsed after the application of the pulse row corresponding to Gradation 10; instead, it is necessary when a certain length of time (for example, 11 ms) has elapsed after that. As a result, the temperature $T_2$ at which the pulse row corresponding to Gradation 2 is applied has returned to a temperature which is approximately equal to the initial temperature $T_0$ (for example, about 50° C.).

By utilizing this fact, the length of a 1-line period can be shortened, thereby making it possible to increase the recording speed.

Next, a thermal recording apparatus to which the thermal-head driving device of an embodiment of this invention is applied will be described in detail with reference to FIG. 7.

In the drawing, reference numeral 110 indicates an ordinary-paper cassette holding ordinary paper constituting the recording sheet; 111 indicates a sensor for detecting the ordinary paper; 106 indicates a feeding motor for picking up the ordinary paper from the cassette 110 and feeding it; and 123 indicates a stepping motor for rotating a platen roller 34 through a speed-reduction mechanism (not shown). The recording paper 11 is fed by the platen roller 34 and a pair of feeding rollers 134. A motor 131 is provided for raising and lowering a thermal head 31. Driven by this motor 131, the thermal head 31 is pressed against the platen 34 through the ink sheet 32 and the recording paper 11 (lowered state), or is separated from the platen 34 (raised state). The reference numeral 139 indicates a motor constituting the driving means of the feeding mechanism for the ink sheet 32. The rotation of this motor 139 is transmitted to the drive shaft of a take-up roll 140, causing the ink sheet 32 to be taken up in the direction indicated by the arrow. The reference numeral 141 indicates a supply roll for supplying the ink sheet 32.

Figure 11:
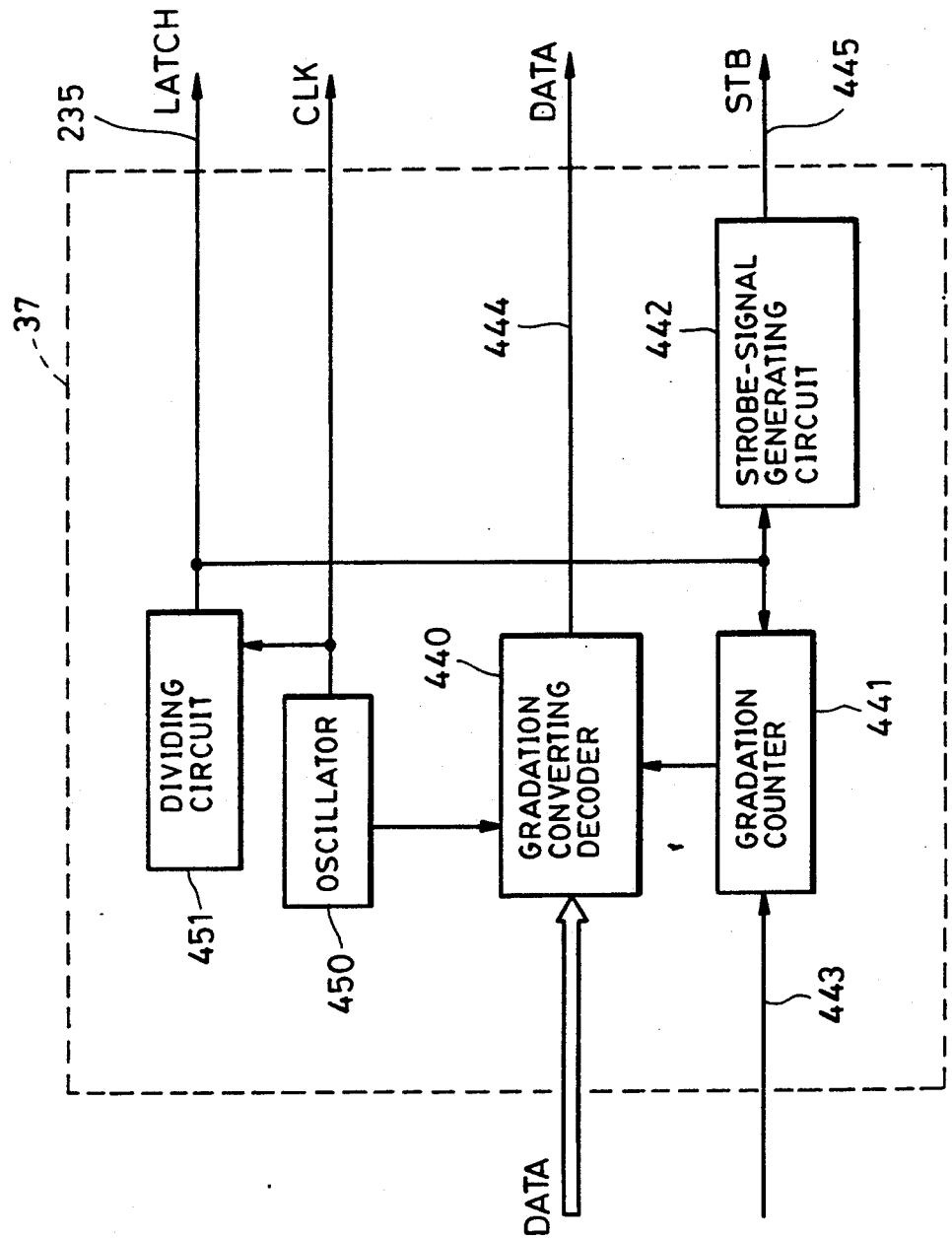
FIG. 11 is a block diagram showing the construction of a head-driving-pulse control circuit.

The reference numeral 35 indicates a buffer memory for temporarily retaining input image data; 36 indicates an imagedata conversion table which is adapted to convert image data read from the buffer memory 35 and which normally consists of a look-up table such as ROM (read only memory); 37 indicates a head-driving-pulse control circuit which is shown in detail in FIG. 11; and 38 indicates a control section for controlling the entire apparatus. The control section 38 is equipped with a CPU (central processing unit) consisting, for example, of a microprocessor, ROM for storing various kinds of data including the control program for the CPU to be described below, RAM (random access memory) used as the work area for the CPU and adapted to temporarily retain various kinds of data, and so on. The reference numeral 39 indicates a display section adapted to display information regarding, for example, the presence of recording paper.

Next, the construction of the thermal head 31 will be described.

Figure 10:
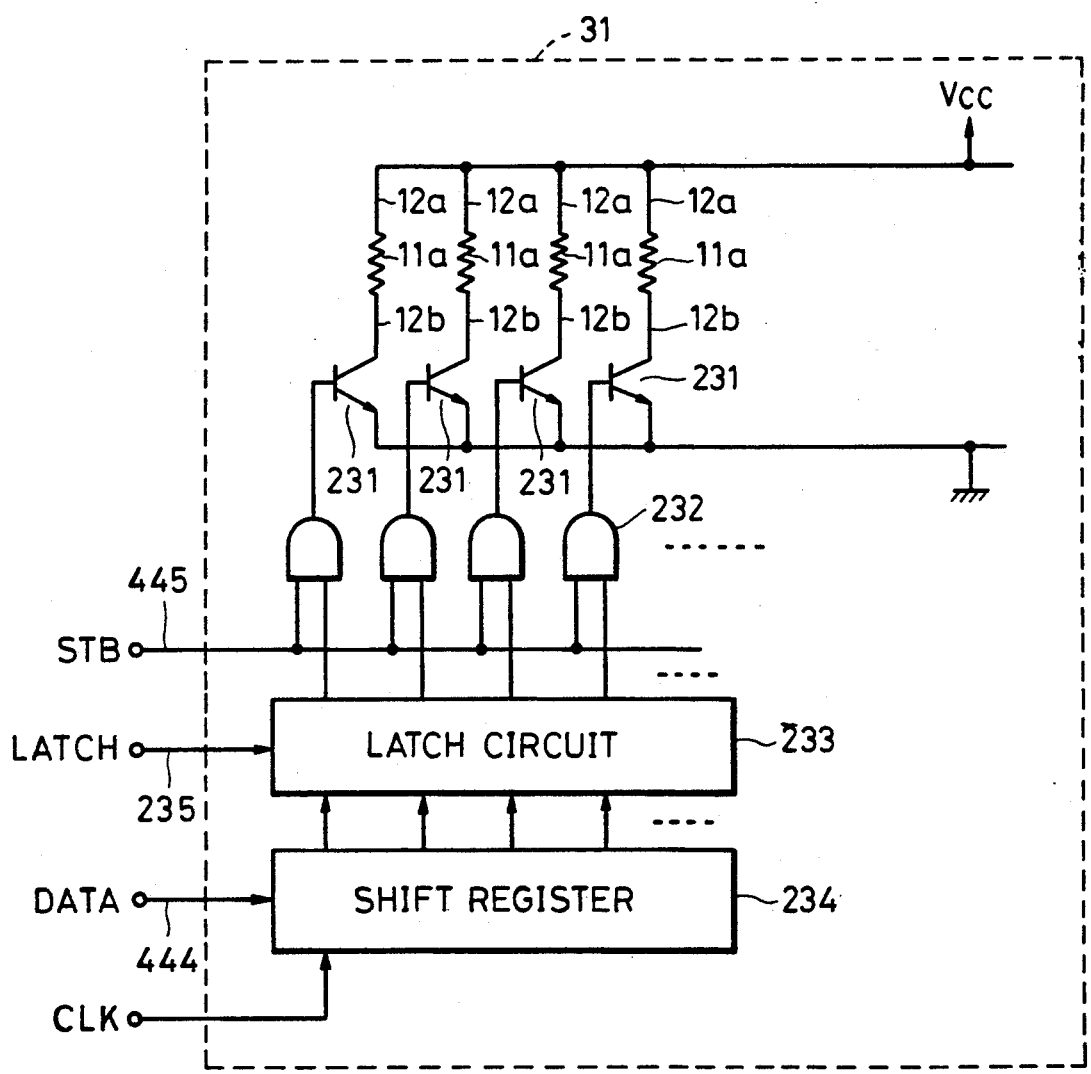
FIG. 10 is a circuit and block diagram showing the construction of a thermal head.

FIG. 10 is a block diagram showing the construction of the thermal head 31.

In the drawing, the reference numeral 11a indicates heating elements; a plurality of them are provided for one line in the width direction of the recording paper 11. The reference numeral 233 indicates a latch circuit adapted to latch recording data for one line, and the reference numeral 234 indicates a shift register adapted to sequentially input serial recording data (gradation data) 444 in synchronization with clock signals CLK. The serial data thus input to the shift register 234 is latched in the latch circuit 233 in response to latch signals 235 and is converted into parallel data. Thus, recording data corresponding to the heating elements is retained in the latch circuit 233. Then, strobe signals STB445 determine the timing and duration for applying voltage, and the output transistor 231 which is connected to the AND circuit 232 retaining data is turned on. This causes electricity to be supplied to the corresponding heating element 11a, which is then heated. The reference numeral 12a indicates common electrodes, i.e., electrodes connected to a common voltage source Vcc and 12b indicates individual electrodes, i.e., electrodes connected to individual output transistors 231.

Next, the head-driving-pulse control circuit 37 will be described with reference to FIG. 11.

The control circuit shown includes an oscillator 450 adapted to output clock pulses CLK having a predetermined frequency; a dividing circuit 451 adapted to divide the clock pulses CLK so as to output a latch signal 235 each time the number of clock pulses which is equal to the number of heating elements for one line in the thermal head 31 is counted; and a gradation converting decoder 440 for receiving data signals corresponding to the pixels of input image data and adapted to transfer gradation data 444 to the register steps of the shift register 234 (FIG. 10) in synchronization with the CLK signals from oscillator 450. Thus, when processing a color image, for example, gradation conversion is effected in the gradation converting decoder 440 for each of the colors yellow, magenta and cyan.

The reference numeral 441 indicates a gradation counter which is adapted to perform counting each time a latch signal 235 is input, and which, in accordance with designated signals received from the above-mentioned CPU 38 via a line 443, executes mod64 (6-bit) counting for a sublimating-ink sheet, and mod16 (4-bit) counting for a dissoluble-ink sheet. The gradation converting decoder 440 compares the count value from the gradation counter 441 with the input pixel data. When the pixel data is larger than or equal to the count value, "1" is output as the gradation data 444. When the pixel data is smaller than the count value, "0" is output. The strobe-signal generating circuit 442 outputs strobe signals STB 445 with a timing somewhat delayed with respect to the latch signals 235, thereby causing the heating elements 11a to be selectively driven to effect recording.

Figure 12:
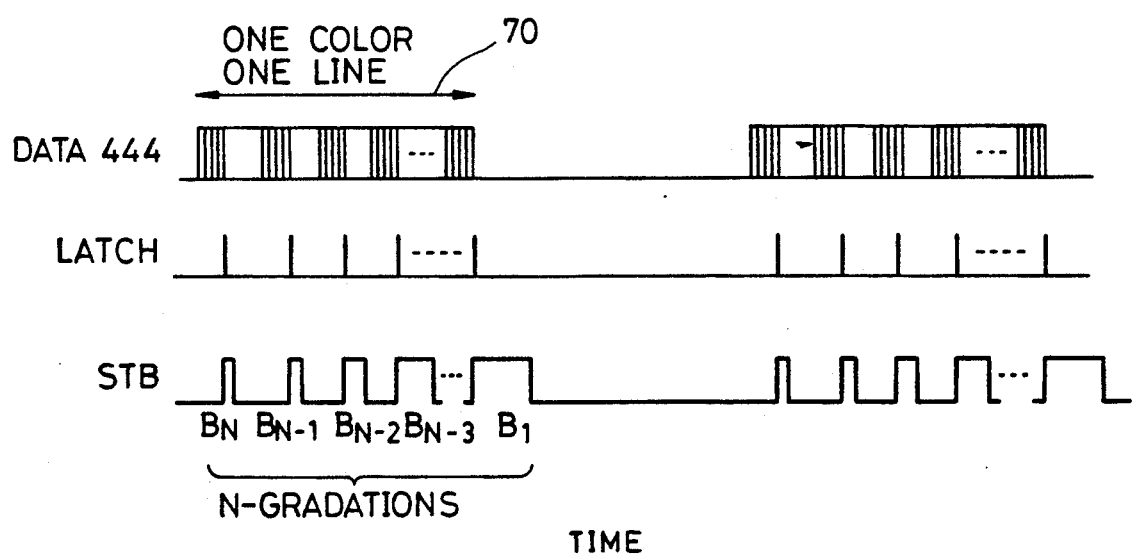
FIG. 12 is a chart showing the timing for the driving of the thermal head and the strobe signals of this embodiment.

FIG. 12 is a chart showing the timing for driving the thermal head 31 (FIG. 10) and the strobe signals STB in this embodiment.

The thermal head 31 is a line-type head, and the reference numeral 70 in FIG. 12 indicates the recording timing for one line. If, for example, the 1-pixel image data input to the gradation converting decoder 440 is composed of 6 bits, 64 values of data can then be set for one pixel. Accordingly, the "N" in the "N-gradations" in this case is 64. First, the gradation data 444 corresponding to the STB signal $B_{64}$ ($B_n$ in FIG. 12) for the first data for one line is transferred to the shift register 234, and is latched by the latch circuit 233 in response to the latch signal 235. Next, the strobe signal 445 is output, and the heating elements to which the data "1" is output are driven for the period corresponding to the pulse width of the strobe signal $B_1$. During this driving, the next block of gradation data 444 is input to the shift register 234; when the signal level of the STB signal 445 is lowered, the next block of gradation data corresponding to STB $B_{63}$ ($B_{n-1}$) latched by the latch circuit in response to the latch signal 235. Thus, the STB signal is output for the period of $B_{63}$. When this operation has been executed 64 times (STB signals $B_{64}$ to $B_1$), the recording for one line is complete.

Thus, the gradation converting decoder 440 inputs image data, and when, of the image data thus input, the value of the m-th pixel data of the line to be recorded is "20", data 444 in which the 20 pieces of data in the latter half are "1" and the 44 (64−20) of data in the first half are "0" is output 64 times in total, while referring to the value of the gradation counter 441, to the m-th step of the shift register 34, which corresponds to the position of that pixel data. It goes without saying that data is set in the other steps of the shift register 234 in accordance with the gradations of the corresponding pixels.

Here, the pulse width of each strobe signal STB is changed in accordance with the number of times the STB signal is output, as shown in FIG. 12. The pulse width of strobe signals STB is adjusted by the strobe-signal generating circuit 442. As stated above, this strobe-signal generating circuit 442 inputs gradation data 444 corresponding to the type of ink sheet 32 by means of a corresponding ROM tables or the like, adjusting, for example, the width and period of the STB signal 445 in accordance with the type of ink sheet 32.

FIG. 13 is a flowchart showing the recording process in a thermal recording apparatus to which this embodiment is applied. This flow chart is stored in the ROM of the above-mentioned CPU 38.

When image data is input in Step S1, the procedure moves on to Step S2, storing the image data in the buffer memory 35. In Step S3, the recording paper 11 is picked up from the cassette 110 and is fed to the recording position. In Step S4, the ink sheet 32 is fed in such a manner that the desired position of the ink sheet 32 is brought to the recording position. Next, the procedure moves on to Step S5, in which the motor 131 is driven to lower the thermal head 31.

In Step S6, 1-line pixel data is read from the buffer memory 35, and is output through the conversion table 36 to the head-driving-pulse control circuit 37. This allows the gradation data 444, the latch signals 235 and the strobe signals STB to be output with the timing shown in FIG. 12. As a result, the thermal head 31 is heated to effect transfer of ink to the recording paper 11. Subsequently, the procedure moves on to Step S7, where the recording paper 11 and the ink sheet 32 are fed for the distance corresponding to one line, and, in Step S8, whether the recording for an entire page has been completed is checked. If the recording for an entire page has not been completed yet, the procedure returns to Step S6, and the pixel data for the next line is read from the buffer memory 35, executing the above-described recording operation again.

In the case of color recording, the recording data for each color is recorded by the page; each time recording in one color is finished, the color section of the ink sheet for the next recording is conveyed to the recording position. The recording paper is also restored to the original position after being passed around the platen 34 by one turn so as to perform recording in another color. By performing this operation for the three colors of, for example, yellow, magenta and cyan, color recording can be executed on a recording-paper sheet. It is also possible to vary the gradation width of the above-mentioned gradation data 444 and the pulse width of the strobe signals STB, in accordance with the type of ink sheet 32 and recording sheet used.

Figure 14:
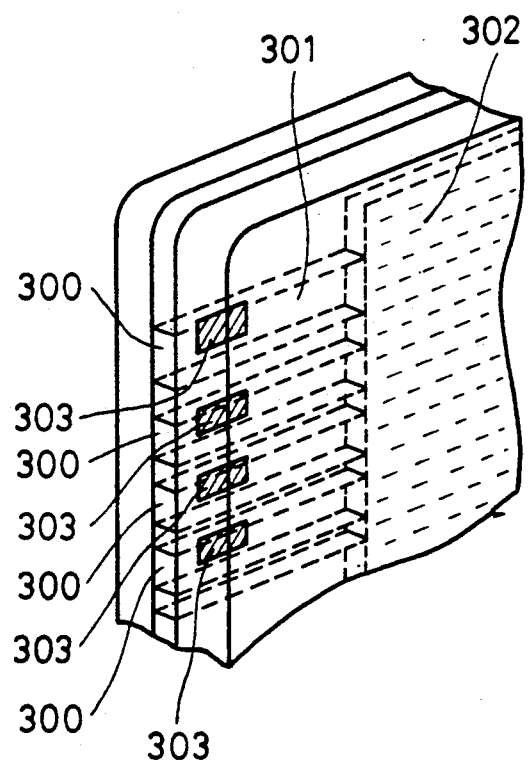
FIG. 14 is a perspective view of an ink-jet head which expels ink through its discharge nozzles.

Next, as another embodiment of recording heads which can be applied to this invention, an ink-jet head will be described. FIG. 14 is a perspective view of an ink-jet head which expels recording liquid through its discharge nozzles.

In FIG. 14, reference numeral 300 indicates orifices serving as the ink-discharge nozzles. These orifices allow ink, which serves as the recording liquid, to be expelled from the head. Reference numeral 301 indicates liquid passages which allow the orifices 300 to communicate with a liquid chamber 302. Reference numeral 303 indicates heaters serving as an electrothermic-conversion means. The heaters 303 impart heat energy for discharge to the ink in the liquid passages 301, and, by virtue of the ink-state changes caused thereby, cause the ink to be expelled through the orifices 300, thereby forming a spray of liquid drops.

In performing recording using this ink-jet head, the liquid chamber 302 and the liquid passages 301 are filled with ink supplied from a main tank (not shown) through a supply pipe (not shown). Then, electricity is supplied to the heaters 303 through a control operation similar to that in the above-described embodiment. This causes the heaters 303 to generate heat, imparting heat energy to the portion of the ink in the vicinity of the heaters 303. As a result, bubbles are generated in this portion of the ink, which causes the volume of the ink to be augmented instantaneously. This causes the ink to be expelled through the orifices 300, forming a spray of ink drops. Recording is effected by causing the ink drops to adhere to a recording medium such as paper.

Thus, the present invention, having the above-described construction, allows gradations to be reproduced more accurately, and excels in recording speed.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A method of driving a recording head having a plurality of heating elements for recording on a recording medium at a density corresponding to a gradation n between X and 1, comprising the steps of:

generating a series of pulses each having a length for energizing said heating elements wherein the position of each said pulse in the series corresponds to a predetermined gradation n through 1 of recording density; and supplying said pulses in succession to the recording head beginning with a pulse corresponding to gradation n and continuing down to a pulse corresponding to gradation 1, thereby driving said recording head, said pulses being applied to said recording head after a period of time allocated for recording on an immediately preceding line, said pulses being applied starting at an instant which follows said period of time allocated for recording by a duration approximately equal to a combined length of said pulses X through (n+1), said pulses being capable of making said gradation uniform.

2. A method of driving a recording head having a plurality of heating elements for recording at multiple gradations wherein the maximum density corresponds to a gradation n between X and 1, comprising the steps of:

generating a series of driving pulses, each having a length, for energizing said heating elements, said driving pulses maintainable for a sufficient time to obtain print densities corresponding to the different gradations; and applying the driving pulses in succession to said heating elements, beginning with pulses whose position corresponds to the maximum-density gradation n and continuing down to pulses whose position corresponds to the minimum-density gradation 1, thereby driving said recording head, said pulses being applied to said recording head after a period of time allocated for recording on an immediately preceding line, said pulses being applied starting at an instant which follows said period of time allocated for recording by a duration approximately equal to a combined length of said pulses X through (n+1), said driving pulses being capable of making said gradation uniform.

3. A method as claimed in one of claims 1 or 2, wherein each of said heating elements provided in said recording head corresponds to a driving circuit and a shift register.

4. A method as claimed in one of claims 1 or 2, wherein said recording head is adapted to heat the corresponding heating elements that number of times which corresponds to the gradation.

5. A recording apparatus for recording on a recording medium at a density corresponding to a gradation n between X and 1, comprising:

a recording head for recording on a recording medium;

a control means for supplying a series of pulses, each having a length, said pulses being capable of making said gradation uniform, wherein the position of each pulse in the series corresponds to a predetermined gradation n through 1, successively to the recording head in order from gradation n down to gradation 1, said pulses being applied to said recording head after a period of time allocated for recording on an immediately preceding line, said pulses being applied starting at an instant which follows said period of time allocated for recording by a duration approximately equal to a combined length of said pulses X through (n+1); and a feeding means for feeding said recording medium.

6. An apparatus as claimed in claim 5, wherein said recording head is adapted to heat the corresponding heating elements the number of times which corresponds to the gradation.

7. A method according to claim 1 or 2, wherein the series of pulses generate incremental gradations of different pulse widths.

8. An apparatus according to claim 5, wherein said pulses in the series corresponding to a predetermined gradation n through 1 are of different pulse widths.

9. A method according to claim 1 or 2, wherein said recording head is a thermal head having a plurality of heat-generating elements.

10. A method according to claim 1 or 2, wherein said recording head is an ink-jet head adapted to form a spray of liquid drops by causing said recording liquid to be expelled through discharge nozzles by virtue of the state changes in the recording liquid which is caused by heat energy generated by an electrothermic-conversion means.

11. An apparatus according to claim 5, wherein said recording head is a thermal head having a plurality of heat-generating elements.

12. An apparatus according to claim 5, wherein said recording head is an ink-jet head adapted to form a spray of liquid drops by causing said recording liquid to be expelled through discharge nozzles by virtue of the state changes in the recording liquid which is caused by heat energy generated by an electrothermic-conversion means.

* * * * *

UNITED STATES PATENT AND TRADEMARK OFFICE
CERTIFICATE OF CORRECTION

PATENT NO. : 5,075,698
DATED : December 24, 1991
INVENTOR(S) : MAKOTO AOKI, ET AL.    Page 1 of 2

It is certified that error appears in the above-identified patent and that said Letters Patent is hereby corrected as shown below:

On the title page:

IN [30] FOREIGN APPLICATION PRIORITY DATA

Insert: --Oct. 6, 1989 [JP] Japan ........ 1-260121--.

IN [56] REFERENCES CITED

Attorney, Agent, or Firm: "Fitzpatrick, Cella Harper & Scinto" should read --Fitzpatrick, Cella, Harper & Scinto--.

COLUMN 1

Line 22, "change to" should read --change--.

COLUMN 3

Line 19, "$T_0°C.$" should read --$T_0°C.,$--.

COLUMN 4

Line 48, "INVENTION" should read --PREFERRED EMBODIMENT--.

COLUMN 5

Line 4, "gradation" should read --gradations--.
Line 16, "FIG. 3(b)" should read --FIG. 9(b)--.
Line 37, "necessary" should read --applied--.

COLUMN 6

Line 6, "imagedata" should read --image data--.

UNITED STATES PATENT AND TRADEMARK OFFICE
CERTIFICATE OF CORRECTION

PATENT NO. : 5,075,698
DATED : December 24, 1991
INVENTOR(S) : MAKOTO AOKI, ET AL.

It is certified that error appears in the above-identified patent and that said Letters Patent is hereby corrected as shown below:

COLUMN 7

Line 47, "shift register 34," should read
--shift register 234,--.

COLUMN 8

Line 2, "position" should read --section--.

COLUMN 10

Line 29, "the" should be deleted.
Line 33, "generate" should read --generates--.

Signed and Sealed this

Eighth Day of June, 1993

Attest:

MICHAEL K. KIRK

*Attesting Officer*   *Acting Commissioner of Patents and Trademarks*